United States Patent Office 3,492,895
Patented Feb. 3, 1970

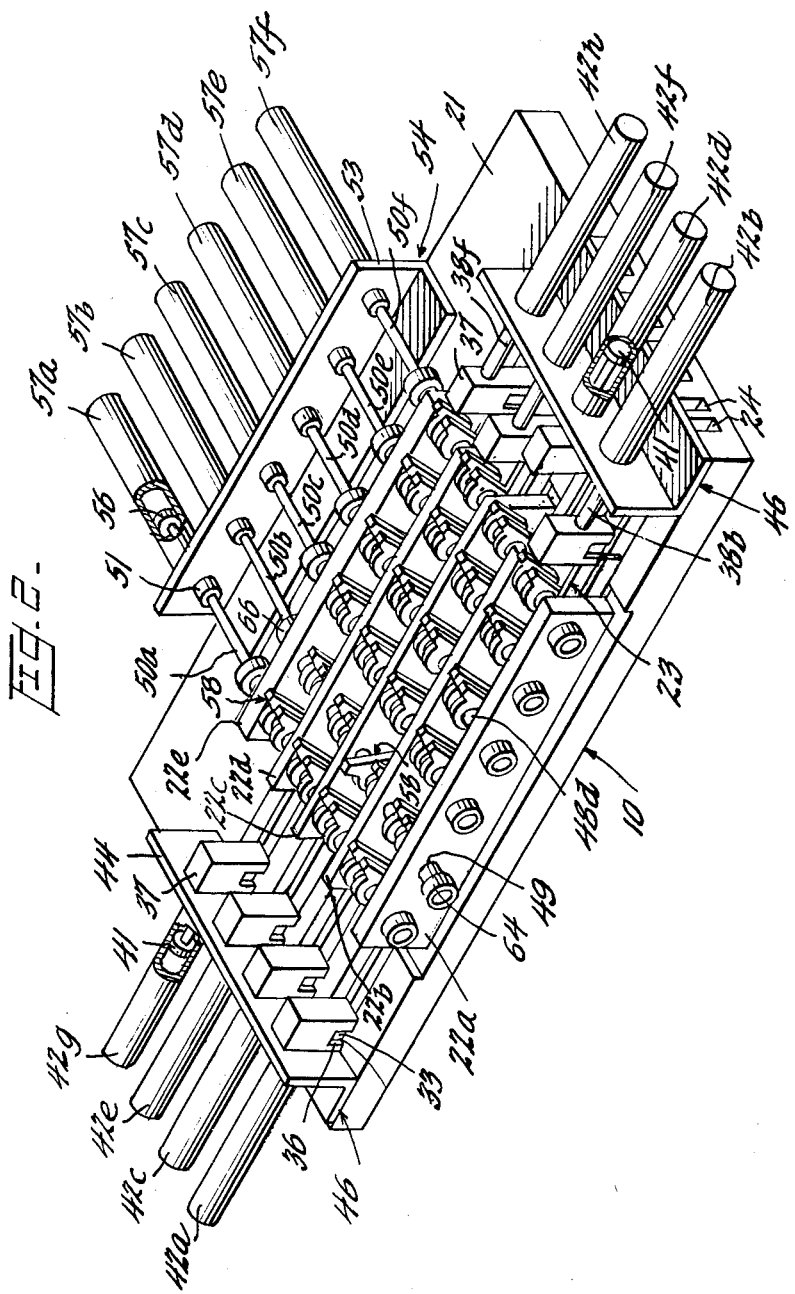

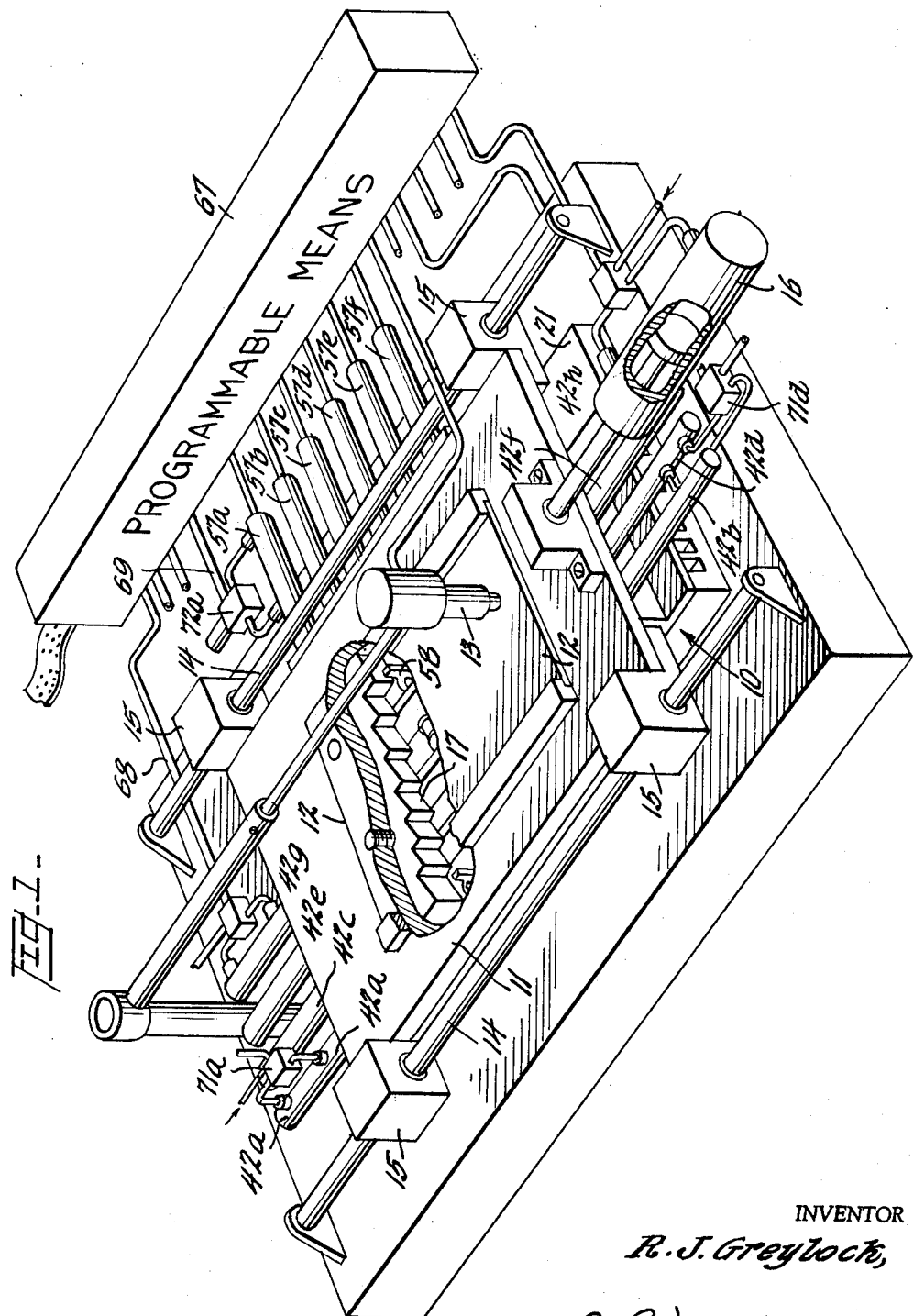

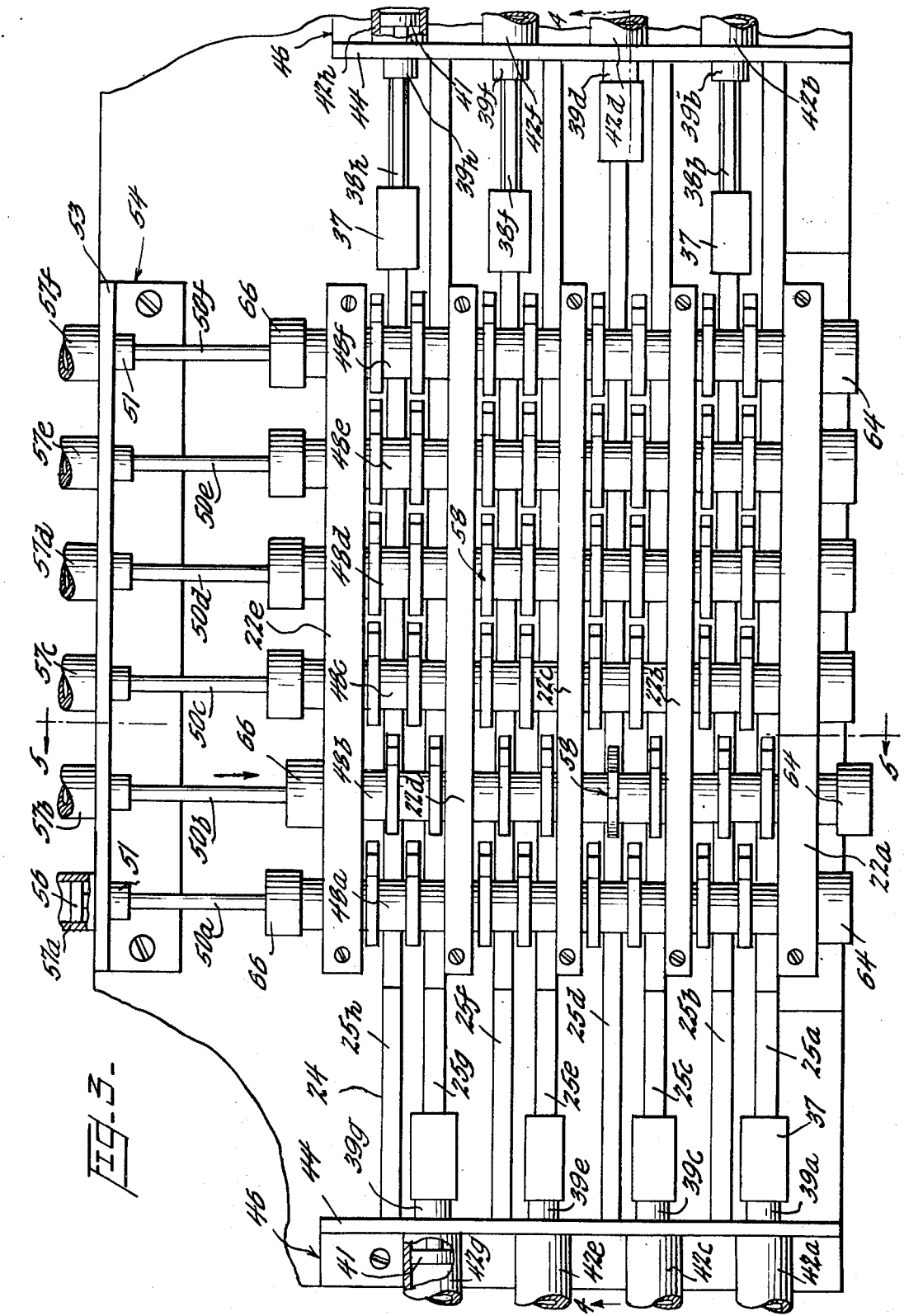

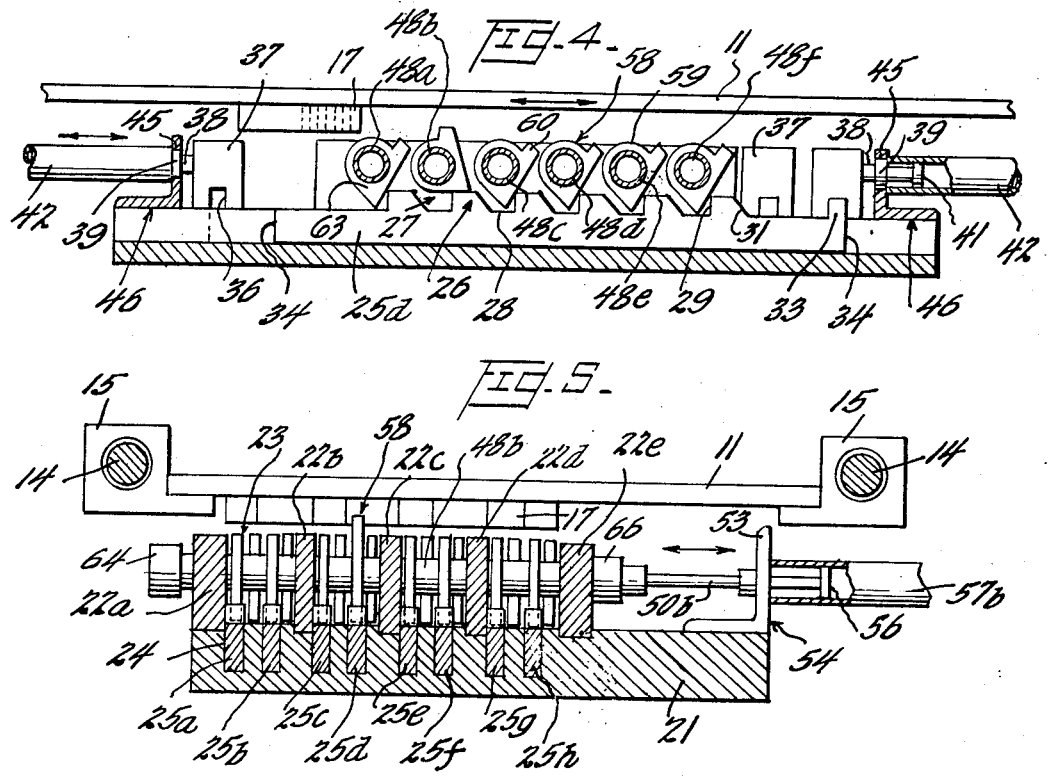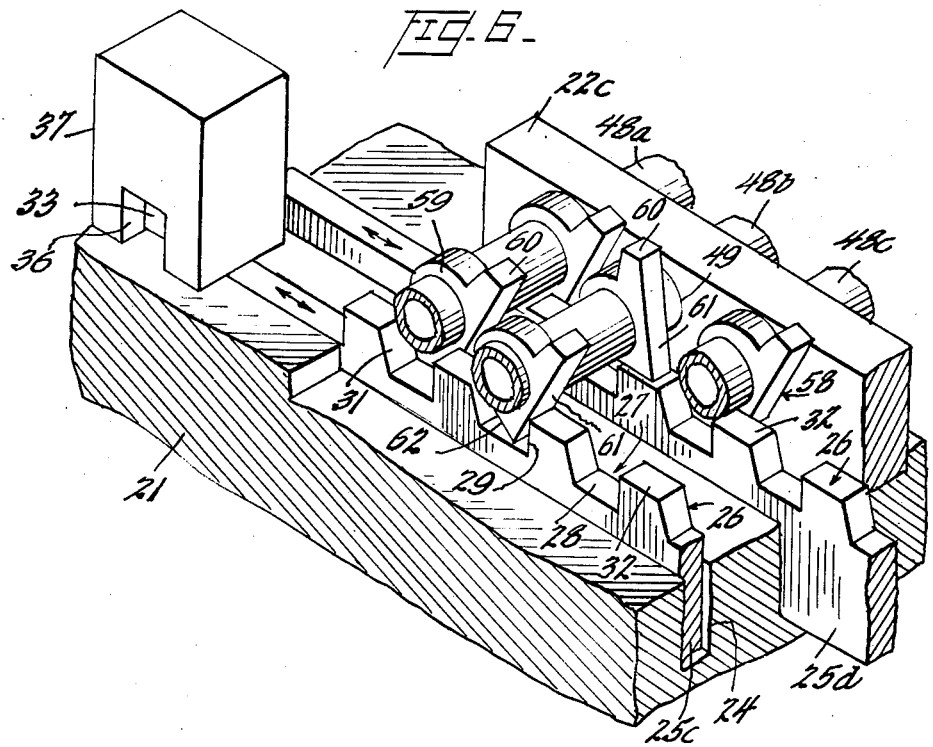

3,492,895
APPARATUS FOR POSITIONING A DEVICE
Richard J. Greylock, Columbus, Ohio, assignor to Western Electric Company, Incorporated, New York, N.Y., a corporation of New York
Filed Jan. 4, 1968, Ser. No. 695,644
Int. Cl. B23g 3/16; B23b 47/28
U.S. Cl. 77—64                                   11 Claims

ABSTRACT OF THE DISCLOSURE

An apparatus for positioning a worktable includes a cordinate array of movable stop members, arranged in rows and columns, that are selectively and individually raised to engage stepped shoulders formed on the underside of the worktable to stop movement of the worktable in a predetermined position.

The stop members of each row are mounted rotatably commonly on an associated one of a plurality of parallel, spaced, slidable, rods which are selectively moved to position the associated rows of stop members over a parallel, spaced arrangement of slidable racks which are perpendicular to the slidable rods. One of the racks is then moved selectively to engage and rock the positioned stop member into the path of one shoulder on the underside of the worktable.

BACKGROUND OF THE INVENTION

Field of the invention

This invention relates to apparatus for postioning a device, and more particularly, to apparatus for sequentially and selectively positioning stop members in the path of a movable device to selectively position the device.

Description of the prior art

In many manfacturing processes, it is necessary to position a workpiece in order to perform a series of assembly or machining operations upon the workpiece. Presently, in laying out a piece of work to be drilled, for example, the workpiece is usually moved under the control of the operator to specified assembly or machining locations. This commonly involves the making of a layout of the work positions on the workpiece at which an operation is to be performed. The part is then positioned manually, such as by a table that may be moved universally in a horizontal plane by means of screws or racks located at angles to each other. In this way, the table may be moved as desired so that, for example, holes may be drilled at specified points.

Another method commonly used to position a workpiece for the performance of a series of work operations is the use of a multiplicity of preset stops along one direction of movement of the workpiece to locate sequentially the workpiece in a desired position with respect to a tool. However, the presently known methods of presetting these stops are cumbersome and time consuming and extremely limited in the number of positions and directions which may be preset.

There is still a need for a versatile, positive acting apparatus which may be programmed for automatic operation to sequentialy select mechanical elements from a group of such elements to position successively a workpiece in order to perform a succession of assembly or machining operations on the workpiece.

SUMMARY OF THE INVENTION

It is an object of this invention to provide a new and improved apparatus for positioning a device.

It is a further object of this invention to provide a new and improved apparatus having an array of stop members which are actuated selectively in a predetermined sequence of movements to establish a succession of stop positions for a device.

It is another object of this invention to provide apparatus for positioning a device which includes moving a preselected group of stop members from an array of stop members in a first direction whereafter one of a plurality of actuator members is moved in a second direction to engage and further move a predetermined stop member from the initially moved group of stop members into the path of the moving device.

It is an additional object of this invention to provide apparatus for positioning a workpiece which includes a plurality of rows of stop members from which a selected row is moved linearly in a first direction whereafter an actuating member is moved in a second direction to rock a selected stop member of the selected row of stop members to move the stop member into the path of a worktable to impede the travel of the worktable and thereby accurately position the worktable and the workpiece with respect to an assembly station for a succession of assembly operations or with respect to a worktool for a succession of machining operations.

With these and other objects in view, the present invention contemplates a plurality of cam-like stop members mounted for rocking or rotational movement on and spaced along each of a plurality of parallel, slidably mounted shafts. A selected shaft is moved slidably to position each of the stop members on the shaft adjacent to one of a plurality of racks which are orthogonally mounted with respect to the shafts. Thereafter, a selected one of the racks is moved to engage and rotate a selected stop member to rock a projecting portion of the stop member into the path of a moving worktable to impede the movement of the worktable having a workpiece placed thereon.

More particularly, a plurality of disced, cam-like stop membesr are arranged in rows and columns with all of the stop members in each row mounted for rotational movement on and spaced along a shaft. A selected one of the shafts is moved axially by a first air cylinder in a first direction to translate the stop members attached to the shaft laterally so that each of the stop members is moved into an associated notch in one of a plurality of parallel, spaced, selectively operable racks. A second air cylinder is actuated to move longitudinally a preselected rack in a second direction perpendicular to the movement of the selected shaft so that an inclined surface of a tooth of the selected rack engages a camming surface of the selected associated stop member.

As the selected rack continues to move, the camming surface of the selected stop member is cammed against the inclined surface of the associated tooth to rotate or to rock the stop member until the camming surface of the stop member is resting on a top surface of the associated tooth of the selected rack. When the camming surface of the selected stop member is resting on the top surface of the associated tooth of the rack, a projecting pawl-like portion or ear of the selected stop member is positioned in the path of one of a plurality of stepped shoulders formed on the underside of a worktable. In this way, the apparatus may selectively and sequentially raise selected stop members into the path of a movable worktable to accurately position the worktable and a workpiece positioned thereon at each of a succession of predetermined stop positions.

Other objects and advantages of the present invention will be apparent from the following detailed description, when considered in conjunction with the accompanying drawings.

BRIEF DESCRIPTION OF THE DRAWING

FIG. 1 is a perspective view of the apparatus of the present invention used in conjunction with, for example, a machine tool, showing control facilities for selectively operating the apparatus;

FIG. 2 is a perspective view showing an apparatus for selectively positioning a device with respect to a worktool in accordance with certain principles of the invention;

FIG. 3 is a plan view of the apparatus shown in FIG. 2 showing a coordinate array of stop members, wherein one of a plurality of rows of disced, cam-like stop members moves linearly and further showing one of the stop members in the row actuated by the movement of a slidably movable rack;

FIG. 4 is a sectional view, taken along lines 4—4 in FIG. 3 showing a device such as a worktable in relation to the apparatus of the present invention with one of the stop members of the apparatus raised to a position by an associated rack to position a projecting ear of the stop member in the path of movement of one of a plurality of shoulders formed on the underside of the worktable;

FIG. 5 is a sectional view, taken along lines 5—5 in FIG. 3 showing one of a plurality of shafts moved axially to position each of the stop members mounted spatially on the shaft into mating engagement with an associated notch of one of the racks and further shows a selected one of the racks moved to rock the selected stop member; and FIG. 6 is an enlarged perspective view of a portion of the apparatus of the present invention showing structural details of the racks, shafts and stop members in the vicinity of the actuated stop member.

DETAILED DESCRIPTION

Referring now to FIG. 1, there is shown a selectively operable positioning apparatus, designated generally by the reference numeral 10, for positioning accurately a worktable 11 (FIGS. 4 and 5) and a workpiece 12 mounted thereon with respect to a machine tool 13. The worktable 11 is mounted on four bearing blocks 15—15 which are mounted for sliding movement on a pair of parallel, spaced rods 14—14 and is moved along the rods under the action of an air cylinder 16. Facilities are provided for mounting the workpiece 12 on the worktable 11 whereafter the worktable is moved successively to a plurality of work positions with respect to the machine tool 13.

As shown in FIGS. 1, 4 and 5, an underside of the worktable 11 is provided with a series of stepped shoulders 17—17. The shoulders 17—17 are offset from each other so that each of the shoulders corresponds to a succession of work positions. Engagement of the shoulders 17—17 by the apparatus 10 locates accurately the worktable 11 with respect to the machine tool 13 for each of the work positions.

Referring now to FIG. 2, the stop positioning apparatus 10 comprises a base 21 on which are mounted a group of spaced, parallel, divider plates 22a—22e. The spaced, parallel divider plates 22a—22e extend partially along the length of the base 21, and partition the base 21 into longitudinal bays, designated generally by the numerals 23—23.

The base 21 within each bay 23 is formed with a pair of longitudinal, spaced guideway slots 24—24 that are parallel to the plates 22a—22e. Within each bay 23, one of the guideway slots 24—24 is spaced from one of the pates 22a—22e associated with the particular bay, and the other slot 24 is adjacent the other plate associated with that particular bay (FIG. 5). The slots 24—24 extend past the ends of the plates 22a—22e to the edges of the base 21.

Referring to FIG. 3, a group of racks or cam bars 25a–25h are slidably positioned within the guideway slots 24—24. As is seen in FIGS. 4 and 6, each of the racks 25a–25h is formed with a plurality of actuator teeth, designated generally by the reference numeral 26—26, separated by notches, designated generally by the numerals 27—27, therealong. Each of the notches 27—27 is defined by a horizontal bottom portion or flat 28 with a vertical wall 29 and an inclined camming wall 31 of associated actuator teeth 26—26. The vertical wall 29 and the inclined camming wall 31 of adjacent notches 27—27 are joined by a level plateau portion or flat 32.

As viewed in FIGS. 2 and 4, the racks 25a–25h have an upstanding projection 33 on each end 34 thereof. The projections on the left-hand ends of the racks 25a, 25c, 25e and 25g extend into openings 36—36 formed in a first or left-hand set of actuator blocks 37—37. Similarly, the intervening racks 25b, 25d, 25f and 25h have upstanding projections 33—33 that extend into a second or right-hand set of actuator blocks 37—37.

Each of the actuating blocks 37—37 is connected to one end of an associated one of a plurality of rods 38a–38h that extend through associated bearings 39a–39h (see FIG. 3). The opposite ends of the rods 38a–38h are connected to, and moved by, pistons 41—41 which are positioned within cylinders 42a–42h. Each of the bearings 39a–39h is supported by the walls of an associated opening 45 formed in an upstanding leg 44 of an angle bracket, designated generally by the numeral 46 (see FIG. 4). The angle bracket 46, as shown in FIG. 2, is supported on the base 21 and is positioned transversely of the guideway slots 24—24 at each end of the base.

It can be seen from FIG. 3 that the racks 25a, 25c and 26g within the bays 23—23 are moved from a rest position by a pushing force exerted by the pistons 41—41 through the rods 38—38 at the left-hand end of the base 21. The racks 25b, 25d, 25f and 25h are moved from a rest position by the pistons 41—41 at the right-hand end of the base 21 exerting a pulling force through the rods 38—38. In this way, it is possible to align the notches 27—27 in rows in adjacent, unoperated racks 25a—25h in the bays 23—23.

Each of a plurality of shafts 48a—48f is aligned with an associated row of the notches 27—27 and extends through aligned openings 49—49 formed in the plates 22a—22e (see FIG. 2). Each of the shafts 48a—48f is joined to an associated one of a plurality of rods 50a—50f which extends through bearings 51—51 (see FIG. 2) mounted in openings in an upstanding leg 53 of an angle bracket, designated generally by the numeral 54, which is supported along one side of the base 21. Each of the rods 50a—50f is connected to an associated one of a plurality of pistons 56—56 which are slidably operated by associated air cylinders 57a–57f. Each of the air cylinders 57a–57f is designated with a letter a through f to correspond to the associated one of the shafts 48a—48f which is operated thereby.

The shafts 48a—48f are assembled with a plurality of pairs of stop members, designated generally by the numerals 58—58, spaced therealong with one pair of stop members of each of the associated shafts 48a—48f positioned within each bay 23 (see FIGS. 2 and 3). Moreover, the stop members 58—58 on any one of the shafts 48a—48f are aligned with an associated row of the notches 27—27 in the spaced, parallel racks 25a–25h. The stop members 58—58 are mounted for individual rocking movement on the shafts 48—48 (see shaft 48b, FIG. 6).

In an unoperated condition, the stop members 58—58 in each bay 23 on any one of the shafts 48a–48f are located, as shown in FIGS. 3 and 6, on shaft 48a, for example. One of the stop members 58—58 of each pair of stops in each bay 23 is positioned between each pair of racks 25—25 within the bay and the other stop member of the pair of stops is positioned between one of the racks and the associated nearest one of the plates 22a–22e.

Each of the stop members 58—58 is semicircular in shape and has an arcuate peripheral portion 59 with an ear or pawl 60 extending therefrom (see FIG. 6). A planar riser 61 is formed along a lower edge and terminates at the end of the pawl 60. The planar riser 61 of each of the stop members 58—58 is joined to the arcuate section 59 by a flat camming surface 62. A depending portion 63 (FIG. 4) of the stop member 58, as defined by the camming surface 62 and the lower portion of the planar riser 61, is heavier than the pawl 60. Thus, in an unoperated condition, each of the stop members 58—58 is maintained in a position with the riser surface 61 held at an incline to the flats 28—28 of the notches 27—27 and with the weighted, depending portion 63 in lateral registration with a notch (FIGS. 4 and 6).

The axial movement of the slidably movable rods 50a–50f by the pistons 56—56 under the action of the air cylinders 57a–57f is limited in either direction by a limit collar 64 which is secured to each of the shafts 48a–48f near the outermost side of plate 22a, and limit collar 66 which is secured to each of the shafts 48a–48f near the outermost side of plate 22e (see FIG. 3).

The limit collars 64 and 66 are positioned on the shafts 48a–48f so that when one of the rods 50a–50f is selected and actuated by an asociated one of the pistons 56—56 and cylinders 57—57 to push the selected one of the rods 50a–50f outwardly away from the cylinder, the pair of stop members 58—58 on the selected one of the shafts 48a–48f in each bay 23 will be moved laterally with the selected shaft until the collar 66 engages the plate 22e to halt the axial movement of the selected shaft. When the collar 66 engages the plate 22e, each of the stop members 58—58 on the selected one of the shafts 48a–48f is positioned within an associated one of the notches 27—27 in one of the racks 25—25 (FIG. 5).

Conversely, when the cylinder 57, associated with the selected one of the shafts 48a–48f, moves in an opposite direction and retracts the previously actuated one of the shafts 48a–48f, the axial movement of the associated rod 50 is limited by the engagement of the associated collar 64 with the plate 22a. Simultaneously, the associated collar 66 moves away from the plate 22e to an initial position.

OPERATION

In order to explain the operation of the apparatus 10 for positioning the workpiece 12 with respect to the machine tool 13, particular reference is made to FIGS. 1 and 3 which depict the specified number of air cylinders 57a–57f. A programmable means, designated generally by the numeral 67, is provided for automatically actuating one of the stop members 58—58 in the coordinate array of stop members and for thereafter actuating the air cylinder 16 to move the worktable 11 until the movement of the worktable is impeded by the engagement of one of the stepped shoulders 17—17 with the actuated stop member. This programmable means may be any one of a great number of commercially available devices, such as punched tape or card reader, a bank of cams, or other electrical or electro-mechanical devices that produce a predetermined sequence of control signals. Output controls signals from the programming means 67 are sequentially applied over leads 68—68 and 69—69 to operate solenoid controlled valves 71—71 and 72—72, respectively, associated with the banks of air cylinders 42a–42h and 57a–57f, respectively.

In operation, one of the air cylinders 57a–57f, for example 57b, is actuated, in response to a control signal from the programmable means 67, to slide the associated rod 50b and the shaft 48b, associated therewith, toward the left, as viewed in FIG. 5. As the shaft 48b is moved axially, the depending portion 63 of each pair of stop member 58—58 mounted on shaft 48b within each bay 23 is translated to position the depending portion of the stop members within the associated notches 27—27 of adjacent racks 25—25 within the bay (FIGS. 3, 5 and 6). The movement of the shaft 48b is halted when the associated collar 66 engages the plate 22e.

An output signal from the programmable means 67 then actuates a preselected one of the air cylinders 42a–42h, for example 42d, whereupon the rack 25d associated with the air cylinder 42d is moved linearly to the right, within the bay 23, as viewed in FIG. 3. As shown in FIG. 6, a selected one of the stop members 58—58 is initially moved within the associated notch 27 in the rack 25d with the depending portion 63 of the stop member inclined to the flat 28 of the notch 27. The linear movement of the rack 25d moves the sloped wall 31 of the notch 27 against the camming surface 62 of the stop member 58 to cam and rock the stop member upwardly until the camming surface is riding on the plateau or flat portion 32 of the rack 25d. In this manner, the selected stop member 58 is locked in position with the pawl 60 projecting upwardly in position to engage an aligned one of the shoulders 17—17 on the underside of the worktable 11 (FIGS. 4, 5 and 6).

When the selected one of the stop members 58—58 has been raised into a position, as shown in FIG. 5, the programmable means 67 generates a control signal to initiate the actuation of the air cylinder 16 to move the worktable 11 until the raised pawl 60 engages the aligned shoulder 17 (see FIG. 1). The movement of the worktable 11 is halted with the workpiece 12 supported thereon now positioned with respect to the machine tool 13 for the performance of, for example, a machining operation.

Following the completion of the machining operation on the workpiece 12, the programmable means 67 generates a signal to operate a valve 71d to admit air to the cylinder 42d in order to push the rod 38d out of the cylinder to move the rack 25d to the left, as viewed in FIG. 3. As the rack 25d moves to the left, the plateau portion 32 moves from under the camming surface 62 of the raised, selected stop member 58. As the associated notch 27 is aligned with the selected stop member 58, the stop member, under the urging of the weighted, depending portion 63, is rocked in a clockwise direction, as viewed in FIG. 4, until the stop member assumes a normal position with the planar riser portion 61 inclined to the flat 28 of the notch.

Then the cylinder 57b is actuated to retract the rod 50b into the cylinder. The movement of the shaft 48b and rod 50b is stopped when the associated collar 64 on the outer end of the shaft is arrested by the outer plate 22a. When the associated collar 64 halts the movement of the shaft 48b, the stop members 58—58 mounted on the shaft 48b in each bay 23 are translated or moved laterally out of mating relation with the associated notches 27—27 in the racks 25—25. The apparatus is now ready for the actuation of another selected one of the cylinders 57a–57f and another selected one of the cylinders 42a–42h by the programmable means 67 to raise another one of the stop members 58—58 for further positioning the worktable 11 for a subsequent machining operation of the workpiece 12.

While the embodiment shown in the figures is limited to a coordinate array having a particular number of rows and columns of stop members 58—58, and a predetermined number of shoulders 17—17, it should be understood that numerous variations of this arrangement could be accomplished without deviating from the concept of the invention herein set forth.

Moreover, it would be within the scope of this invention to slidably mount the base 21 on a pair of parallel, spaced rods similar to, but transverse to, the rods 14—14. In this way, there would be two arrays or matrices of stop members, the lower array programmed to accurately position the base 21 in a first direction, and the upper array (described hereinbefore) used to accurately position the worktable 11 in a second direction.

Also, the invention may include a plurality of stop members which are spaced along each of a plurality of parallel, slidably mounted shafts, with each of the shafts and stop members mounted thereon selectively movable in unison in a first direction and with the stop members mounted for individual movement in a second direction.

A selected shaft is moved slidably to position each of the stop members on the shaft adjacent to one of a plurality of racks whereafter a selected one of the racks is moved to engage and move a selected stop member in the second direction into the path of a moving worktable.

Furthermore, it is within the scope of this invention to arrange groups of stop members along a plurality of concentric rings, or along radiating axes, whereupon each group of stop members is selectively movable in a first direction whereafter a selected one of a plurality of movable, radially extending or ring-like racks is actuated to operate a predetermined one of the stop members in the moved group.

It is to be understood that the above-described arrangements are simply illustrative of the invention. Other arrangements may be devised by those skilled in the art which will embody the principles of the invention and fall within the spirit and scope thereof.

What is claimed is:

1. A mechanical selector device comprising:
   a plurality of groups of members, said members in each of said groups being mounted for individual movement about and along a fixed axis, said axis of each of said groups being parallel to the axes of the other groups;
   selectively operable means for moving one of said groups of members along its axis in a first direction; and
   means for moving a selected one of said members in said moved group about the axis of said group.

2. A selector mechanism comprising:
   a plurality of members arranged in a coordinate array of rows and columns, each of said members in each of said rows being mounted for individual rotation;
   means for moving a selected one of said rows of members to translate each of the members in said row from its associated column; and
   means operable selectively subsequent to the moving of said row of members for rotating at least one of said members in said row.

3. A mechanical positioning mechanism comprising:
   a plurality of spaced parallel shafts;
   means mounting said shafts for axial movement;
   a group of spaced stop members mounted rotatably on each of said shafts;
   means for moving a predetermined one of said shafts axially and the associated stop members mounted thereon laterally; and
   selectively operable means for rotating one of the stop members on said predetermined shaft.

4. In a mechanical selector;
   a plurality of members arranged in a coordinate array of rows and columns;
   means mounting each of said members for rotating movement and for lateral motion along its rotary axis;
   means for imparting a lateral motion to a selected one of said rows of members to move said members out of their associated columns; and
   means for selectively rotating any one of said members moved from its column.

5. In a positioning device for locating a workpiece at preselected positions;
   a movably mounted worktable for supporting said workpiece;
   a slidably movable member, said slidably movable member mounted spatially with respect to said worktable;
   a plurality of stop members rotatably mounted on and spaced along said slidably movable member;
   means formed on the underside of said worktable for engaging said stop members to impede the movement of said worktable;
   selectively operable means for engaging one of said stop members to rotate said one stop member into the path of movement of one of said engaging means; and
   means for sequentially moving said slidably movable member and said selectively operable means.

6. In a mechanical selector;
   a plurality of members positioned in a coordinate array of rows and columns;
   means mounting each of said members for individual rotary movement and for simultaneous lateral movement along the axis of rotation of each of said members;
   a plurality of means spaced axially of said members from each column of said members for imparting rotary movement to any of said members moved from an associated column and into registration therewith;
   means for selectively imparting lateral movement to a row of said members to move said members into registration with said rotary imparting means; and
   means for selectively operating any of said rotary imparting means to rotate the registered member in the translated row.

7. In an apparatus for selectively positioning a workpiece with respect to a workstation comprising a mechanical selector as defined in claim 6 in combination with,
   a worktable for supporting said workpiece,
   means mounting said worktable for movement relative to said mechanical selector and said workstation, and
   means on said worktable engageable with any of said rotated members in said selector for limiting movement of said worktable and positioning said workpiece to be worked on at said workstation.

8. In an apparatus for selectively positioning a workpiece with respect to a workstation as defined in claim 7, wherein,
   said means on said worktable engageable with said rotated members comprises a plurality of stepped shoulders, each of said rotated members associated with one of said shoulders and cooperating therewith to permit selective positioning of a workpiece on said worktable with respect to said workstation.

9. A mechanism for positioning a worktable with respect to a workstation comprising:
   a plurality of spaced, parallel shafts mounted for reciprocable movement;
   a coordinate array of stop members arranged in rows and columns with the members in each row being mounted in spaced relationship along a separate one of said shafts and all of the members being mounted for individual rotation on said shafts;
   camming bars positioned slidably, individually between adjacent columns of said stop members, said camming bars having a plurality of notches formed therein and spaced therealong, said notches being aligned with said rows of stop members;
   means for moving selectively one of said shafts axially to move the stop members mounted thereon into registration with notches in said camming bars; and
   means for moving a selected one of said camming bars to cam and rotate one of said stop members.

10. A mechanism for arresting the movement of a worktable to precisely locate a workpiece mounted thereon with respect to a workstation, said worktable having a plurality of stepped shoulders formed on the underside thereof, which comprises:
    a plurality of spaced, parallel shafts mounted for longitudinal movement;
    a plurality of stop members spaced along each of said shafts and mounted rotatably thereon, said stop members on said shafts forming a coordinate array of rows and columns;
    a plurality of racks, each of which is positioned slidably parallel and adjacent to associated columns of said stop members, each of said racks having a plurality of notches formed therealong, each of said notches aligned with and juxtaposed to one of said stop members;

selectively operable means for moving one of said shafts to position each of said stop members in said row on said shaft in registration with the associated notch of said adjacent rack; and means for selectively actuating one of said racks to cam and rotate the registered stop member upwardly into position to engage one of said stepped shoulders to arrest movement of said worktable.

11. A locating device for positioning a worktable having a workpiece mounted thereon with respect to a working tool which comprises:

a base;

a plurality of spaced plates mounted on said base and upstanding therefrom to partition said base into longitudinal bays, each of said plates having longitudinally spaced bearing holes therein;

a pair of slidably movable racks positioned in each of said bays, said racks mounted in each of said bays being spaced laterally from each other, each of said racks having a plurality of notches formed therealong;

a plurality of spaced, parallel shafts positioned transversely with respect to said racks and mounted slidably in said bearing holes in said plates;

a pair of stop members mounted rotatably on each shaft in each of said bays, said stop members being normally interposed between said racks in said bays;

means mounted on said shafts for limiting axial movement of said shafts with respect to said plates to permit selective positioning of said stop members on said shafts in registration with associated ones of said notches;

selectively operable means for actuating one of said shafts to move said stop members on said shaft into registration with the associated notches in said racks;

means operable subsequent to operation of said actuating means for moving a predetermined one of said racks to cam and rotate the particular stop member upwardly;

means on said worktable cooperable with any rotated stop member for limiting movement of said worktable; and means for moving said worktable to advance said movement limiting means into engagement with said rotated stop member to selectively and relatively position said workpiece with respect to said tool.

References Cited

FOREIGN PATENTS 348,853   10/1960   Switzerland.

FRANCIS S. HUSAR, Primary Examiner

U.S. Cl. X.R.

29—65; 51—216, 240; 83—396, 414; 269—63